US008861009B2

(12) United States Patent
Furuhata et al.

(10) Patent No.: US 8,861,009 B2
(45) Date of Patent: *Oct. 14, 2014

(54) FUNCTION EXPANSION METHOD USING PRINT DATA FOR A POINT-OF-SALE TERMINAL

(71) Applicant: Seiko Epson Corporation, Tokyo (JP)

(72) Inventors: Tadashi Furuhata, Shiojiri (JP); Akio Takamoto, Matsumoto (JP); Tomohiro Kodama, Matsumoto (JP); Hitoshi Oyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,272

(22) Filed: Jul. 31, 2013

(65) Prior Publication Data

US 2013/0314727 A1 Nov. 28, 2013

Related U.S. Application Data

(63) Continuation of application No. 13/225,909, filed on Sep. 6, 2011, now Pat. No. 8,526,045.

(30) Foreign Application Priority Data

Sep. 6, 2010 (JP) ................. 2010-198643

(51) Int. Cl.
*G06F 3/12* (2006.01)
(52) U.S. Cl.
CPC ............ *G06F 3/1225* (2013.01); *G06F 3/1284* (2013.01); *G06F 3/1205* (2013.01)
USPC ....................................... 358/1.15

(58) Field of Classification Search
USPC ........................................ 358/1.15
See application file for complete search history.

(56) References Cited

U.S. PATENT DOCUMENTS

| 5,678,059 | A | 10/1997 | Ramaswamy et al. |
| 6,263,384 | B1 | 7/2001 | Yanase |

(Continued)

FOREIGN PATENT DOCUMENTS

| EP | 1 764 680 A2 | 3/2007 |
| JP | 08-69427 | 3/1996 |

(Continued)

OTHER PUBLICATIONS

Machine translation of JP 2006-338443 to Takamoto.*

(Continued)

*Primary Examiner* — Eric A Rust
(74) *Attorney, Agent, or Firm* — Nutter McClennen & Fish LLP; John J. Penny, Jr.; Taylor M. Coon (57) ABSTRACT

Various functions can be easily added using print data output from an existing application without modifying the existing application program. A function expansion method for executing a process that expands the functions of an application runs on a computer that operates according to an operating system on the operating system kernel layer, executes a specific process according to an application on an application layer, and has one or more communication ports, includes a step of acquiring print data output from the application on the operating system kernel layer, and a step of performing at the application layer a process expanding the function of the acquired print data, and outputs the print data after processing to a suitable communication port.

16 Claims, 4 Drawing Sheets

(56) References Cited

U.S. PATENT DOCUMENTS

| | | |
|---|---|---|
| 7,014,110 B2 | 3/2006 | Minowa et al. |
| 7,239,413 B2 | 7/2007 | Owen et al. |
| 7,454,762 B2 | 11/2008 | Brake, Jr. et al. |
| 7,731,084 B2 | 6/2010 | Redick et al. |
| 8,348,750 B2 | 1/2013 | Jordan et al. |
| 8,526,045 B2 | 9/2013 | Furuhata et al. |
| 8,693,036 B2 | 4/2014 | Oyama et al. |
| 2001/0032266 A1 | 10/2001 | Minowa |
| 2002/0089687 A1 | 7/2002 | Ferlitsch et al. |
| 2002/0154333 A1 | 10/2002 | Akashi |
| 2003/0036979 A1 | 2/2003 | Tokorotani |
| 2005/0028093 A1 | 2/2005 | Michel et al. |
| 2005/0211773 A1 | 9/2005 | Nobutani |
| 2006/0197969 A1 | 9/2006 | Takagi |
| 2008/0165285 A1 | 7/2008 | Thompson et al. |
| 2009/0066996 A1 | 3/2009 | Minowa |
| 2009/0116053 A1* | 5/2009 | Selvaraj .................. 358/1.15 |
| 2009/0237717 A1 | 9/2009 | Takamoto et al. |
| 2010/0157348 A1 | 6/2010 | Takagi |
| 2010/0182638 A1 | 7/2010 | Kimura et al. |
| 2011/0184822 A1 | 7/2011 | Matkovic |
| 2012/0057184 A1 | 3/2012 | Furuhata et al. |
| 2012/0057202 A1 | 3/2012 | Oyama et al. |
| 2012/0069404 A1 | 3/2012 | Kodama et al. |
| 2013/0057885 A1 | 3/2013 | Minowa |

FOREIGN PATENT DOCUMENTS

| | | |
|---|---|---|
| JP | 10-187393 A | 7/1998 |
| JP | 11-134272 A | 5/1999 |
| JP | 2001-357457 A | 12/2001 |
| JP | 2005/321873 A | 11/2005 |
| JP | 2006-239946 A | 9/2006 |
| JP | 2006-260455 A | 9/2006 |
| JP | 2006/338443 A | 12/2006 |
| JP | 2007-004558 A | 1/2007 |
| JP | 2007-058463 A | 3/2007 |
| JP | 2007-304799 A | 11/2007 |
| JP | 2009/226689 A | 10/2009 |
| JP | 2009/226690 A | 10/2009 |
| JP | 2010-186458 A | 8/2010 |
| KR | 2007-0107765 A | 11/2007 |

OTHER PUBLICATIONS

Extended European Search Report issued Dec. 27, 2011 for Application No. 11179255.2.*

* cited by examiner

FUNCTION EXPANSION METHOD USING PRINT DATA FOR A POINT-OF-SALE TERMINAL

This application claims priority under 35 U.S.C. §120 to U.S. application Ser. No. 13/225,909 filed on Sep. 6, 2011 and under 35 U.S.C. §119 to Japanese Application. No. 2010-198643 filed on Sep. 6, 2010 which are hereby incorporated by reference in their entireties.

BACKGROUND

1. Technical Field

The present invention relates to a method of expanding the functions of an existing application using print data output from the application, and relates more particularly to a method of easily expanding application functionality without changing the existing application.

2. Related Art

Point-of-sale (POS) systems, which are a type of sales management system, are commonly used in supermarkets and other retail stores. The POS server and plural POS terminals (registers) of a POS system are connected over a network, and each operates and runs specific processes based on the applications installed in each device. A printer is normally connected to each POS terminal, and outputs receipts and coupons as instructed by the application. Systems that are architecturally similar to POS systems and output information in various forms are also deployed in businesses such as hospitals and shipping companies.

Adding new functions and replacing system components is often necessary in such systems as technology improves and business needs change, but because such systems are usually central to business operations, and are connected to other systems in complex ways, modifying the applications that are used is not easy.

To address this problem as it relates to output process functions, Japanese Unexamined Patent Appl. Pub. JP-A-H08-69427 teaches a device that performs a modem function in a personal computer that can eliminate the microprocessor and memory required in a conventional modem without needing to modify the existing application program.

Japanese Unexamined Patent Appl. Pub. JP-A-2006-338443 teaches a device that can access one communication port and cause a printer connected to another communication port to simultaneously print a duplicate copy without modifying the application program.

JP-A-H08-69427 and JP-A-2006-338443 only address limited output system functions such as the modem and a duplicate printing function, however, and do not address many other needs. In addition, because JP-A-2006-338443 operates at the operating system kernel level, constructing new functions (program development) is not generally easy and function is limited.

SUMMARY

An object of at least one embodiment of the present invention is to provide a method of expanding the functions of an existing application using print data output from the application, and more particularly to provide a function expansion method that can easily provide a variety of additional functions without changing the existing application program.

A first aspect of at least one embodiment of the invention is a function expansion method for executing a process that expands application functionality, runs on a computer that operates according to an operating system on the operating system kernel layer, executes a specific process according to an application on an application layer, and has one or more communication ports, the function expansion method including: a data acquisition step in which the computer acquires print data output from the application to the communication port at the operating system kernel layer before the print data is received at the communication port; and a function expansion step in which the computer performs at the application layer a process expanding the function of print data acquired by the data acquisition step, and outputs the print data after processing to the communication port suited to the data.

In another aspect of at least one embodiment of the invention, the function expansion step includes a step of analyzing the acquired print data, and determining the content of the function expansion process and the communication port used for data output based on the result of the analysis.

Further preferably in another aspect of at least one embodiment of the invention, the function expansion step includes a step of executing a command conversion process when the commands expressed by the acquired print data and the commands of the device connected to the selected output communication port differ.

Further preferably in another aspect of at least one embodiment of the invention, the content of the function expansion process includes any of a group of operations including changing the print content of the print data, changing the output communication port, generating print data for a new printout, or acquiring information from the print data.

Another aspect of at least one embodiment of the invention is a function expansion device that executes a process that expands application functionality is rendered by a computer that operates according to an operating system on the operating system kernel layer, executes a specific process according to an application on an application layer, and has one or more communication ports, the function expansion device including a data acquisition unit that acquires print data output from the application to the communication port at the operating system kernel layer before the print data is received at the communication port; and a function expansion unit that performs at the application layer a process that expands the function of print data acquired by the data acquisition unit, and outputs the print data after processing to the communication port suited to the data.

Another aspect of at least one embodiment of the invention is a computer-readable recording medium that records a program that causes a computer to execute the steps of the function expansion method described above. The recording medium can be a tangible recording medium or a non-transitory recording medium.

Other objects and features together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

The following embodiments do not, however, limit the scope of the invention as described in the following claims. Note, further, that identical or like parts are referenced by like reference numerals in the accompanying figures.

Figure 1:
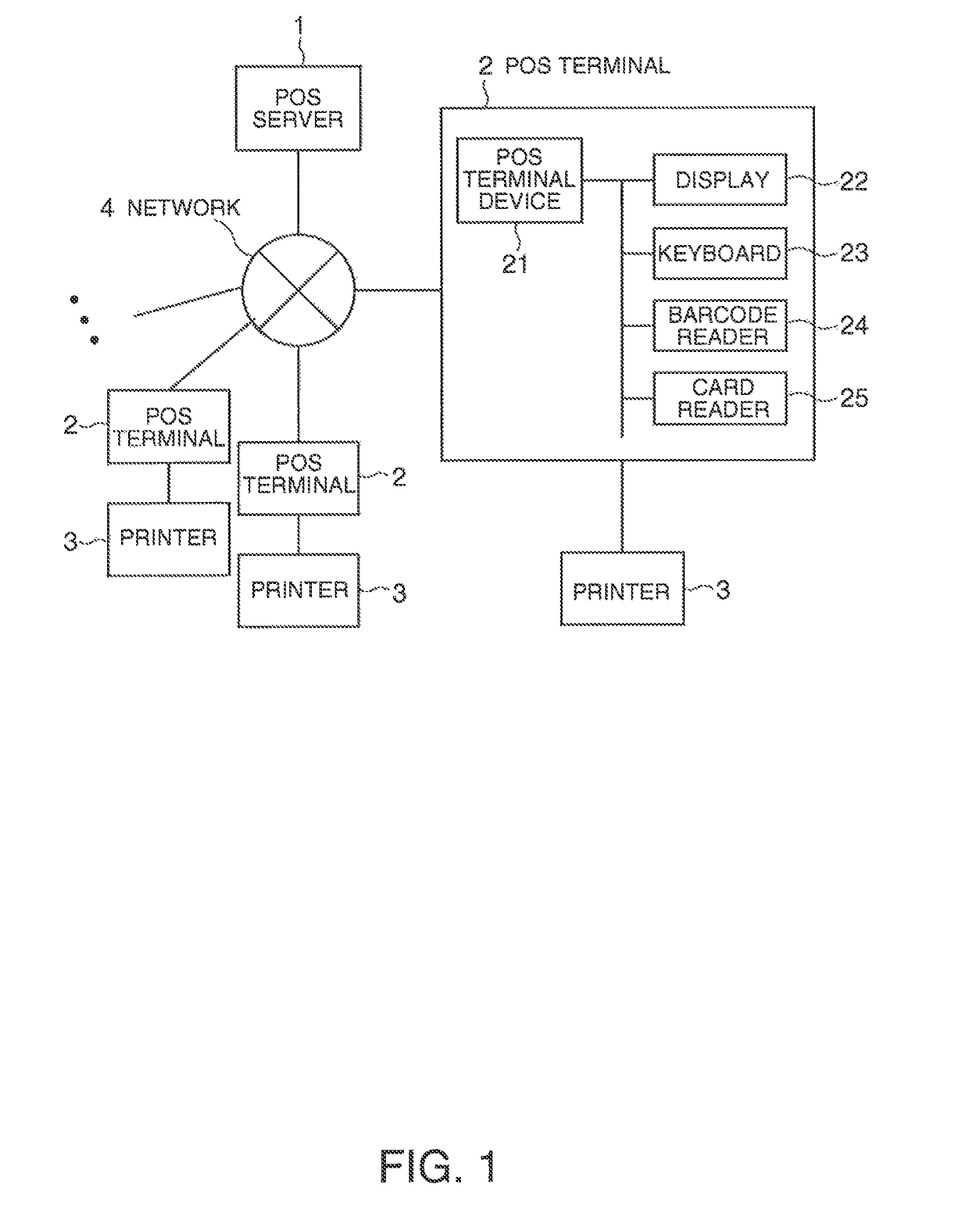
FIG. 1 is a block diagram showing the configuration of a POS system and POS terminal devices according to the invention.
Figure 2:
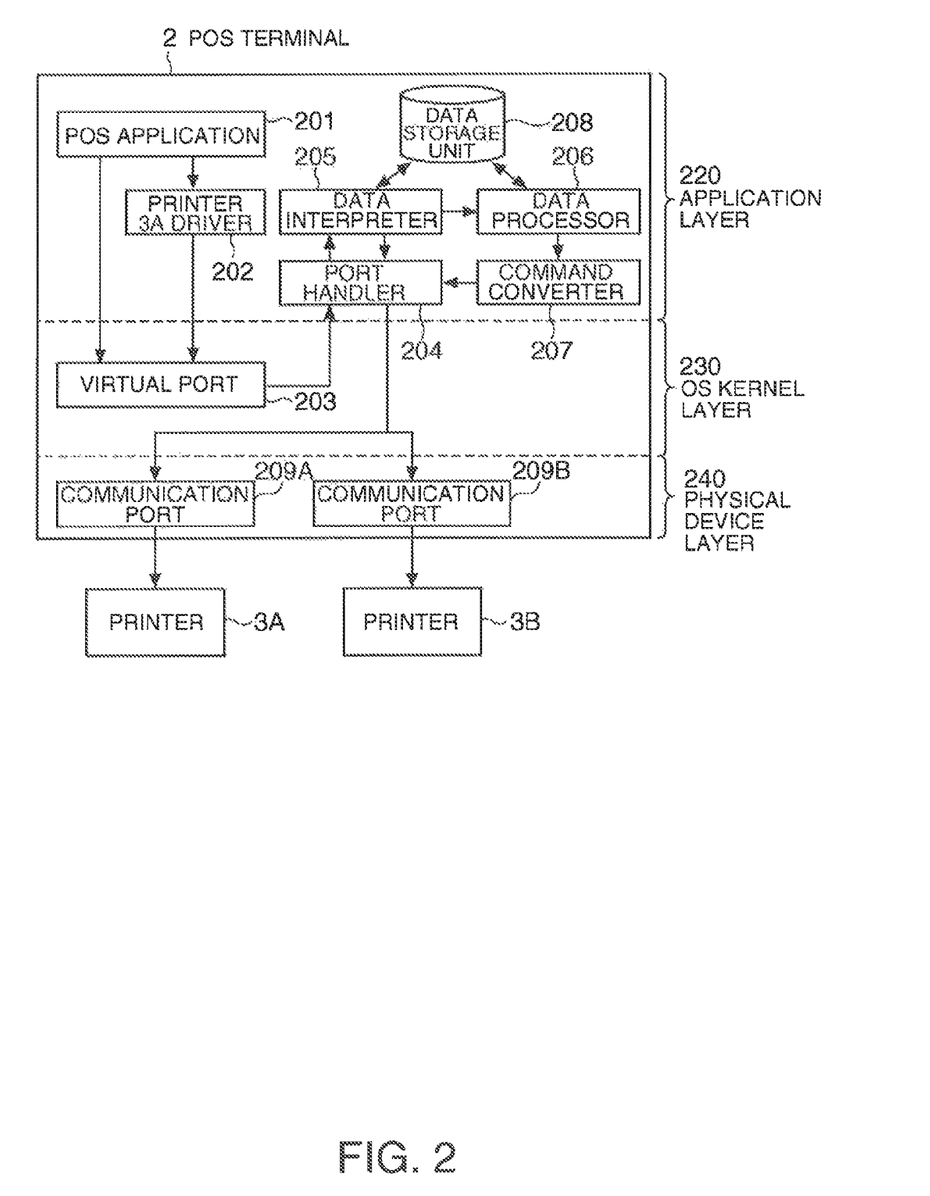
FIG. 2 is a function block diagram of a POS terminal device.

FIG. 1 shows an example of a POS terminal according to this embodiment of the invention. FIG. 2 is a function block diagram of the POS terminal device. The POS terminal 2 shown in FIG. 1 and FIG. 2 is a device that uses the invention, and acquires print data output from a POS application 201 at the virtual port 203 (data acquisition unit) of the OS kernel layer 230. The POS terminal 2 receives the acquired data at the port handler 204 of the application layer 220, and executes a specific function expansion process. The processed print data is then output from the port handler 204 to the communication port 209 corresponding to the processed data. By running this process, the POS terminal 2 can easily expand the functions of the existing POS application 201 without changing the POS application 201 program.

This embodiment of the invention describes a POS system such as used in a supermarket, and as shown in FIG. 1 has a plurality of POS terminals 2 connected through a network 4 to a POS server 1. The POS server 1 is a computer system that manages the plural POS terminals 2, and runs processes to tabulate and manage data acquired from the POS terminals 2.

A POS terminal 2 is installed at each register, and each POS terminal 2 is connected to a printer 3. The printer 3 outputs receipts and coupons based on print data output from the POS terminal 2. The POS terminal 2 is thus positioned as the host device of the printer 3.

As shown in FIG. 1, each POS terminal 2 includes a POS terminal device 21, display 22, keyboard 23, barcode reader 24, and card reader 25. The display 22 displays product prices, for example, to the customer, and the keyboard 23 is used by the operator to input product information including prices and product codes, and customer information such as sex or age. The barcode reader 24 is used to get product information by reading product barcodes. The card reader 25 reads information stored on a card and retrieves information needed to complete the transaction.

The POS terminal device 21 generates and outputs information printed on the receipts or coupons to the printer 3 based on information acquired by the keyboard 23, barcode reader 24, and card reader 25. The POS terminal device 21 is a computer including a CPU, RAM, ROM, and hard disk drive or other storage device not shown. A POS application 201 program described below and a program for function expansion processing are stored in ROM, and processes are executed by the CPU operating according to these programs.

The functional configuration of the POS terminal 2 is shown in FIG. 2. The POS application 201 of the POS terminal 2 runs a process to generate and output the information printed on receipts and coupons, and the data generated at this time is the source data before function expansion. The generated print data is in the format output directly to the printer 3A, or data in the format passed to the driver 202 of the printer 3A. The former type is generated when generating simple print data for printing plain text.

The printer driver 202 is a printer driver for the printer 3A, and outputs the data output from the POS application 201 as print data based on the command system for the type of printer 3A (device) so that it can be received and printed by the printer 3A.

As shown in FIG. 2, the POS application 201 and printer driver 202 belong to the application layer 220 on which programs execute processes based on the operating system (OS) of the computer. Both the POS application 201 and printer driver 202 are rendered by programs stored in ROM that specify the content of each process, and a CPU and other hardware components that execute processes based on the programs.

The virtual port 203 receives the print data (referred to herein as the "source print data") output from the POS application 201 or printer driver 202 at the OS kernel layer 230 where the operating system resides before the data is passed to the communication port 209. The virtual port 203 passes the acquired source print data to the port handler 204.

The port handler 204, data interpreter 205, data processor 206, command converter 207, and data storage unit 208 are the function expansion units that use the source print data, and POS application 201 functionality is expanded by the processes executed by these parts The port handler 204 passes the source print data received from the virtual port 203 to the data interpreter 205, and runs a process that receives print data output from the function expansion process (referred to here as the "processed print data") and outputs the processed print data to the appropriate communication port 209A/B.

The data interpreter 20 analyzes the source print data and determines the content of the function expansion process, and determines the communication port 209 to which the processed print data is output.

The data processor 206 processes the source print data according to the process content determined by the data interpreter 205.

The command converter 207 runs a process to convert commands when the command language used by the printer 3A/3B connected to the communication ports 209A/209B specified by the source print data differs from the command language of the printer 3 connected to the communication ports 209A/209B to which the processed print data is output.

The data storage unit 208 stores data used by the data interpreter 205 and data processor 206. In this embodiment of the invention, logo data is stored, for example, and is used when adding a logo to source print data for a receipt that does not contain a logo. Note that the data storage unit 208 is a hard disk drive or other storage device.

Specific steps in the foregoing processes executed by the function expansion units are described below.

Note that the virtual port 203, port handler 204, data interpreter 205, data processor 206, and command converter 207 are rendered by respective programs that implement the processes executed by each unit, and a CPU and other hardware components that execute the processes according to the programs. The programs associated with these parts are function expansion programs according to the invention.

The POS terminal 2 also includes communication port 209A and communication port 209B on the physical device layer 240. Communication port 209A is connected to printers 3A and 3B. In this embodiment of the invention communication port 209A is a serial communication COM port, and communication port 209B is a USB communication port for USB devices. The printers 3 may be different types of printers, and in this embodiment of the invention printer 3A is a monochrome printer, and printer 3B is a color printer, for example. Note, further, that the POS terminal 2 has two communication ports 209A/209B and two printers 3A/3B are connected to the POS terminal 2 in this embodiment of the invention, but the number of communication ports and printers is not so limited, and there may be one or three or more of each.

Figure 3:
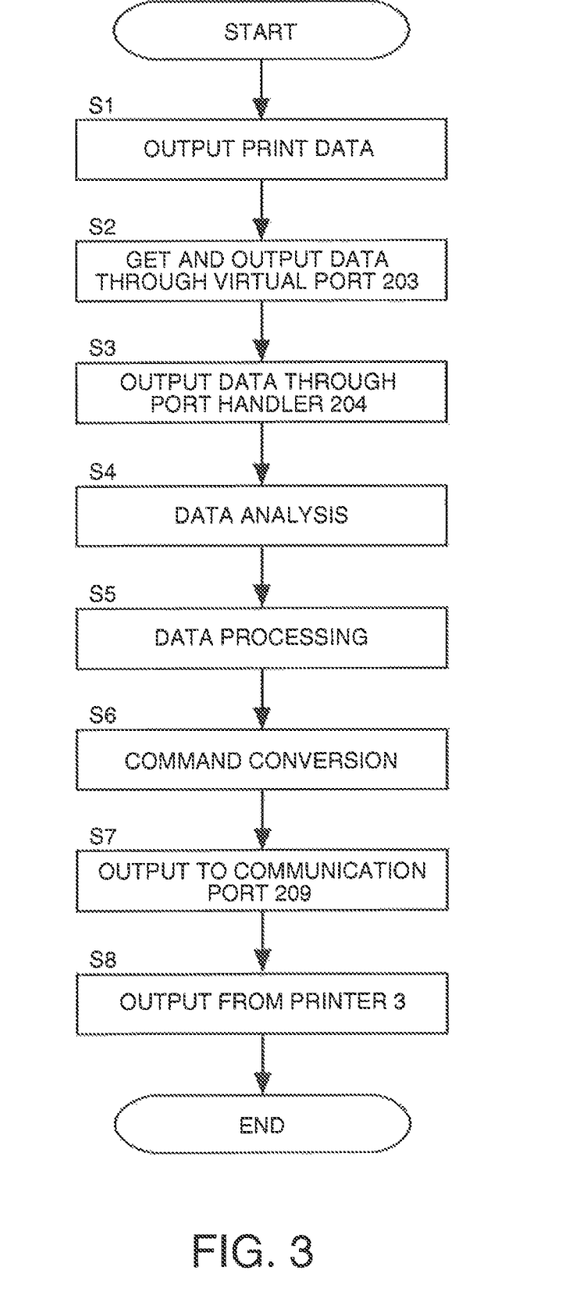
FIG. 3 is a flow chart of the function expansion process.

The POS terminal 2 configured as described above runs a POS application function expansion process using the source print data, and specific steps in this process are described below. FIG. 3 is a flow chart of the steps in the function expansion process.

As described above, the source print data is output directly from the POS application 201 or through the printer 3A driver 202 (step S1). The source print data is, for example, print data for a receipt to be output from printer 3A, communication port 209A is therefore specified as the communication port of the output device, and the source print data contains commands for printer 3A.

The output source print data is intercepted by the virtual port 203 before it reaches the specified communication port (communication port 209A in this example) (step S2). This process is achieved by configuring the registry (priority settings) so that data output to any communication port 209 is first received by the virtual port 203. This configuration change is made when the OS boots up. The received source print data is then passed from the virtual port 203 to the port handler 204 on the application layer 220 (step S2).

The port handler 204 then passes the received source print data to the data interpreter 205 (step S3). The data interpreter 205 interprets the commands in the source print data, and analyzes the data content (step S4). The content of the function expansion process and which communication port 209 to address are determined based on the results of this analysis.

More specifically, the data interpreter 205 determines the type of printout produced by the source print data (such as a receipt, coupon, or journal), checks if specific data (text stringer image) is contained in the source print data, or determines the content of specific data in the source print data, for example, and determines the content of predefined processes according to the results of these operations. The data interpreter 205 also determines the communication port 209 corresponding to the printer 3 suited to output the processed print data obtained from these processes. The content of the function expansion process may include, for example, changing the content printed by the print data (such as adding or deleting data), changing the output printer 3, generating new output, or using information contained in the print data for other purposes, and specific content is predefined from among these operations. A more specific example of function expansions is described below.

The output device communication port selected by the data interpreter 205 is reported to the port handler 204, and content of the function expansion process (process content) is reported to the data processor 206. The data interpreter 205 also references data stored in the data storage unit 208 as needed by the process steps. For example, information linking analysis results to process content is stored in the data storage unit 208. Note that if the process content and output device are fixed irrespective of the source print data, the data interpreter 205 is not required and the source print data is passed from the port handler 204 to the data processor 206.

Next, the data processor 206 processes the source print data (step S5). More specifically, the data processor 206 processes the print data according to the previously determined function expansion process content, and generates processed print data. A specific example of this process is described below. Data in the data storage unit 208 may also be referenced as needed in this process. When there are plural processes to perform, the data processor 206 may include plural processing units corresponding to the individual process content. In addition, if the data interpreter 205 determines that data processing is not needed, the data processor 206 does not perform a processing operation.

When command conversion is required for the processed print data generated by the data processor 206, the command converter 207 runs a command conversion process (step S6). As described above, because the print data is generated with commands that depend on the printer 3 to which the print data is sent, commands must be converted according to the addressed output device when the commands in the source print data differ from the commands of the output printer identified as described above. Because the source print data is generated with commands for printer 3A in this embodiment of the invention, the command conversion process is executed when the output device is changed to printer 3B. The processed print data is then passed to the port handler 204. Note that when command conversion is not necessary, the print data sent from the data processor 206 is passed to the port handler 204.

The port handler 204 then outputs the processed print data that was received to the selected communication port (step S7). In this embodiment of the invention the port handler 204 outputs to communication port 209A and/or communication port 209B. Note that when a function expansion process is not executed, the source print data is output to the specified communication port (communication port 209A in this example).

The print data is then sent from the communication port to the connected printer 3, the printer 3 prints according to the received print data and a receipt or other printout is output (step S8). For example, monochrome printing is output from printer 3A, and color printing is output from printer 3B.

The function expansion process of this POS terminal 2 is executed as described in general terms above, and is described with reference to a more specific example below.

An example of a process that changes the output content of the print data and is applied to the source print data reduces or omits line space between printed text strings in order to reduce paper consumption and conserve resources. This process determines the content of the process based on the type of printout identified by the data interpreter 205, and the data processor 206 then executes the process.

A store logo could also be added to receipts or coupons. In this case, too, the data interpreter 205 determines the process based on the type of printout identified, and the data processor 206 runs a process that reads logo image data from the data storage unit 208 and adds the logo to the source print data.

Another example for a process is changing all or part of monochrome source print data to color print data. In this case, the process content is determined based on the type of printout identified by the data interpreter 205, or detection of specific data for adding color. The data processor 206 then runs a process to change the selected part to color data. Because the output printer 3 is also changed in this case in this embodiment of the invention, the command converter 207 process also executes.

An example of a function expansion that primarily changes the output printer 3 is described next. Changing the output device of all printouts or some printouts in order to print on a new printer 3 with higher print quality may be desirable. If the print quality of printer 3B is higher in this embodiment of the invention, the source print data is changed to data for printing on the printer 3B, and the output address is changed to communication port 209B.

Plural printers 3 could also be driven to produce multiple copies of the same content. In this case the data processor 20 duplicates the source print data according to the output count, and the command converter 207 converts print commands according to the output device used for each copy. In this embodiment of the invention, the same printout is produced by both printer 3A and printer 3B. Another process may also be combined with the process that changes data content so that, for example, a color logo is added to the data output from printer 3B.

The output device can also be changed according to the print data content. For example, when order tickets are output in a restaurant and the different orders (dishes) are prepared at different cooking stations, the data interpreter 205 determines the cooking station where the order ticket should be output from the content of the source print data, and selects the printer 3 installed at that station as the output device. If the source print data contains orders that are prepared at different stations, the order tickets are separated by cooking station, and different order tickets are output from the printers 3 installed at the respective stations.

An example of creating a new printout is a process that produces a new coupon when the source print data is receipt data and a specific product is contained in the print data. For example, if data for a product for which a coupon should be issued is detected in the source print data, the data interpreter 205 determines that the source print data should be printed directly by printer 3A for monochrome printing, and a coupon related to that product should be printed in color by printer 3B. Based on this decision, the data processor 206 reads coupon data stored in data storage unit 208 and generates print data for the coupon. The command converter 207 also operates as needed, and a receipt and a coupon are output.

Another example of function expansion may use information contained in the source print data for another purpose. For example, when the source print data is receipt data, information about the products sold and time of sale, for example, could be collected and tabulated, and supplied to a system (application) that creates marketing plans. In this case the data processor 206 acquires and tabulates the information.

As described above, a POS terminal 2 according to this embodiment of the invention can expand the functions of a POS system of which a main function is creating printout using print data output from the POS application 201. A POS terminal and POS system that do not have such a function expansion capability can be relatively easily improved to the POS terminal 2 described above and a POS system using the POS terminal 2.

Figure 4:
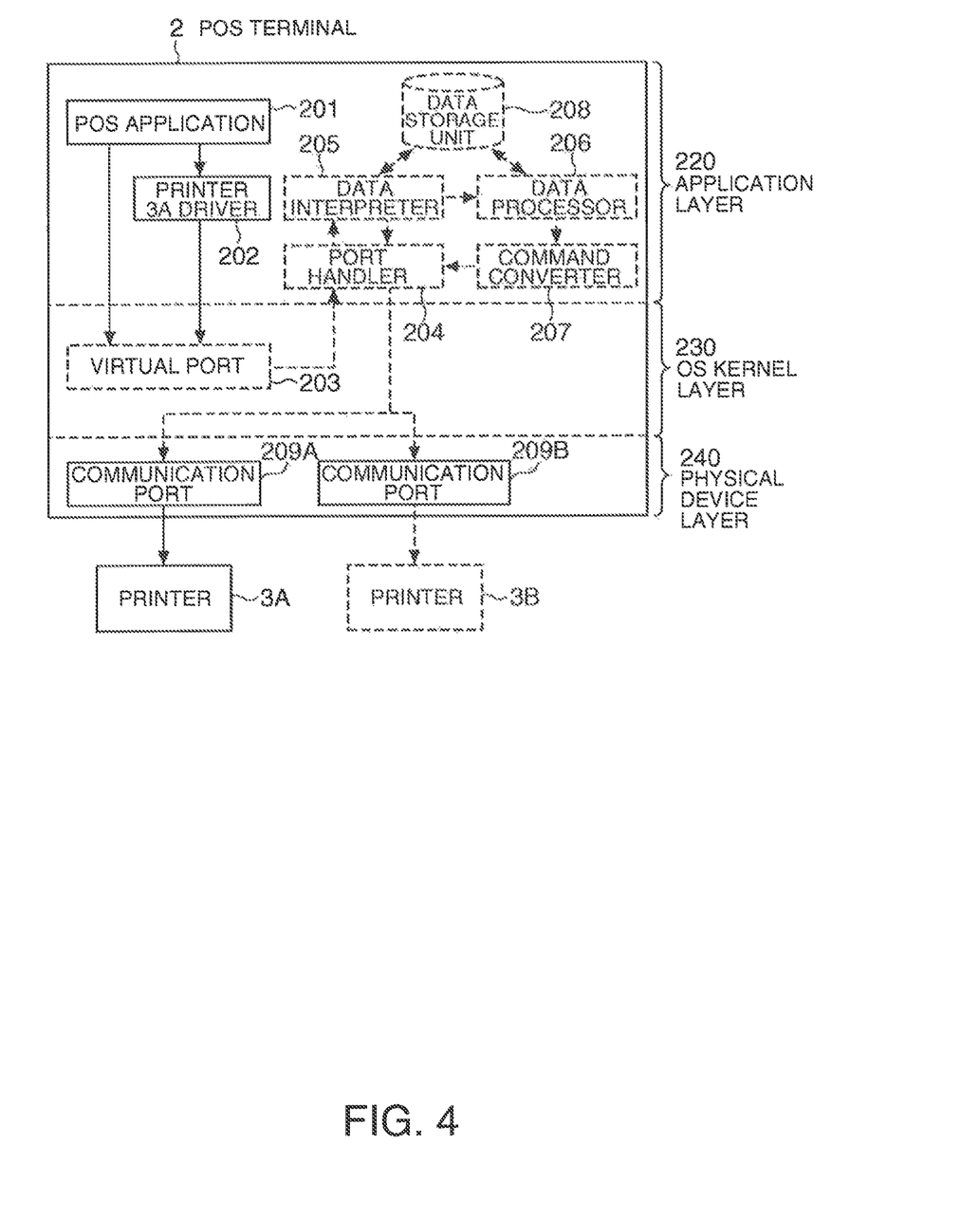
FIG. 4 describes an improvement of the POS system.

FIG. 4 is a block diagram showing such an improvement. FIG. 4 shows the same functional components as in FIG. 2 with the solid lines indicating the POS terminal and POS system that do not execute the function expansion process described above. More specifically, the system before improvement receives print data output directly from the POS application 201 or through the printer driver 202 at the communication port 209A, and outputs from printer 3A. The POS terminal 2 according to this embodiment of the invention and a POS system using the same can be achieved by adding the parts denoted by dotted lines to the existing system.

More specifically, function expansion of an existing POS system is possible without modifying the existing POS application 201 by adding the function expansion program, the data stored in the data storage unit 208, and a new printer 3B as described above. This improvement (addition) can be done by installing a new printer 3B and printer driver software including the data and function expansion program described above. Note, further, that the function expansion program and data could be added without also installing a new printer.

The function expansion method of the invention as described above can thus be used to expand the functions of a POS system in many ways by means of a method that does not involve changing the POS application program. In addition, because the main function expansion process executes on the application layer of the computer, programs that perform a variety of processes can be easily developed.

The POS server 1 is connected to plural POS terminals 2 in the embodiment described above, but the invention is not so limited and can be adapted to an environment in which one POS terminal and plural printers, for example, are deployed.

The foregoing embodiment of the invention describes a POS system by way of example, but the invention is not limited to POS systems and can be applied to other types of systems having a specific application including outputting printed materials from a printer, including systems used in hospitals and shipping companies, for example. The invention is particularly useful when the modification of an existing application program is difficult.

The POS application program and programs for function expansion processes are stored in ROM in the foregoing embodiment by way of example, but storing these programs is not limited to ROM devices, and any suitable tangible recording medium or non-transitory recording medium can be used such as RAM, a hard disk drive, optical disks, magneto-optical discs, flash memory or other storage media can be used. The programs can also he stored on separate storage media.

The scope of the invention is not limited to the foregoing embodiments, and includes the invention described in the accompanying claims and equivalents thereof.

What is claimed is:

1. A function expansion method for executing a process that expands functionality of an application program configured to output print data, comprising:
   outputting the print data to a first communication port connected to a first printer by the application program, the first printer being of a first type configured to print a first type of data but not a second, different type of data;
   acquiring the print data by a program for function expansion processing before the print data is received at the first communication port;
   executing the function expansion processing based on the print data acquired by the program for the function expansion processing; and
   outputting the print data processed by the function expansion processing to the first communication port or a second communication port connected to a second printer by the program for function expansion processing, the second printer being of a second type configured to print the second type of data but not the first type of data, wherein
   executing the function expansion processing includes determining whether the first printer is suitable for printing the print data, the determining including determining whether the print data includes the first type of data or the second type of data;
   when it is determined that the first printer is not suitable for printing the print data, outputting the print data processed by the function expansion processing includes outputting the print data to the second communication port and not outputting the print data to the first communication port; and
   when it is determined that the first printer is suitable for printing the print data, outputting the print data processed by the function expansion processing includes outputting the print data to the first communication port wherein the application program is a Point-of-Sales application program, and the Point-of-Sales application program generates the print data printed on a receipt.

2. The function expansion method described in claim 1, wherein the function expansion processing comprises:
  analyzing data content of the print data by the program for the function expansion processing so as to determine whether the print data is of the first type of data or the second type of data; and
  determining a data processing according to the result of the analysis.

3. The function expansion method described in claim 2, wherein
  the function expansion processing further comprises:
  performing the data processing determined; and
  determining whether to output the print data to the first communication port or the second communication port.

4. The function expansion method described in claim 3, wherein
  the function expansion processing further comprises:
  converting a first command in the print data performed by the data processing to a second command for the second printer when the print data is being output to the second communication port.

5. The function expansion method described in claim 1, wherein the first printer prints the receipt.

6. The function expansion method described in claim 2, wherein
  the application program and the program for function expansion processing operate on an application layer; and
  the print data is acquired at an operating system kernel layer on which an operating system operates.

7. The function expansion method described in claim 1, wherein:
  the print data is output to an operating system kernel layer by the application program,
  the operating system kernel layer executes processes according to one or more applications on an application layer,
  the one or more applications include the application program and the program for function expansion processing, and
  the print data processed by the function expansion processing is output from the application layer to the operating system kernel layer.

8. The function expansion method described in claim 1, wherein the function expansion processing is executed outside an operating system kernel layer.

9. The function expansion method described in claim 1, further comprising printing the output print data processed by the function expansion processing.

10. A function expansion device that executes a process configured to expand functionality of an application program configured to output print data, comprising:
  a first communication port configured to output data to a first printer being of a first type configured to print a first type of data but not a second, different type of data;
  a second communication port configured to output data to a second printer being of a second type configured to print the second type of data but not the first type of data;
  a data acquisition unit configured to acquire the print data generated by the application program to the first communication port before the print data is received at the first communication port;
  a function expansion unit configured to perform a function expansion processing based on the print data acquired by the data acquisition unit, wherein
  the function expansion processing includes determining whether the first printer is suitable for printing the print data, the determining including determining whether the print data includes the first type of data or the second type of data;
  when it is determined that the first printer is not suitable for printing the print data, the function expansion unit outputs the print data processed by the function expansion processing to the second communication port and not to the first communication port; and
  when it is determined that the first printer is suitable for printing the print data, the function expansion unit outputs the print data to the first communication port wherein the application program is a Point-of-Sales application program, and the Point-of-Sales application program generates the print data printed on a receipt.

11. The function expansion device described in claim 10, wherein
  the function expansion processing analyzes data content of the print data acquired by the data acquisition unit so as to determine whether the print data is of the first type of data or the second type of data, and determines a data processing according to the result of the analysis.

12. The function expansion device described in claim 11, wherein
  the function expansion processing performs the data processing determined and determines whether to output the print data to the first communication port or the second communication port.

13. The function expansion device described in claim 12, wherein
  the function expansion processing converts a first command in the print data performed by the data processing to a second command for the second printer when the print data is being output to the second communication port.

14. The function expansion device described in claim 10, wherein:
  the data acquisition unit acquires the print data from an operating system kernel layer of the device that executes processes according to one or more applications on an application layer of the device;
  the application program, the data acquisition unit, and the function expansion unit are on the application layer;
  the function expansion unit outputs the print data processed by the function expansion processing from the application layer to the operating system kernel layer.

15. The function expansion device described in claim 10, wherein the function expansion processing is executed outside an operating system kernel layer of the device.

16. The function expansion device described in claim 10, further comprising a processor that executes the function expansion unit and the data acquisition unit.

* * * * *